Feb. 23, 1932. C. G. FILZER 1,846,387
BLOW TORCH
Filed Feb. 12, 1929
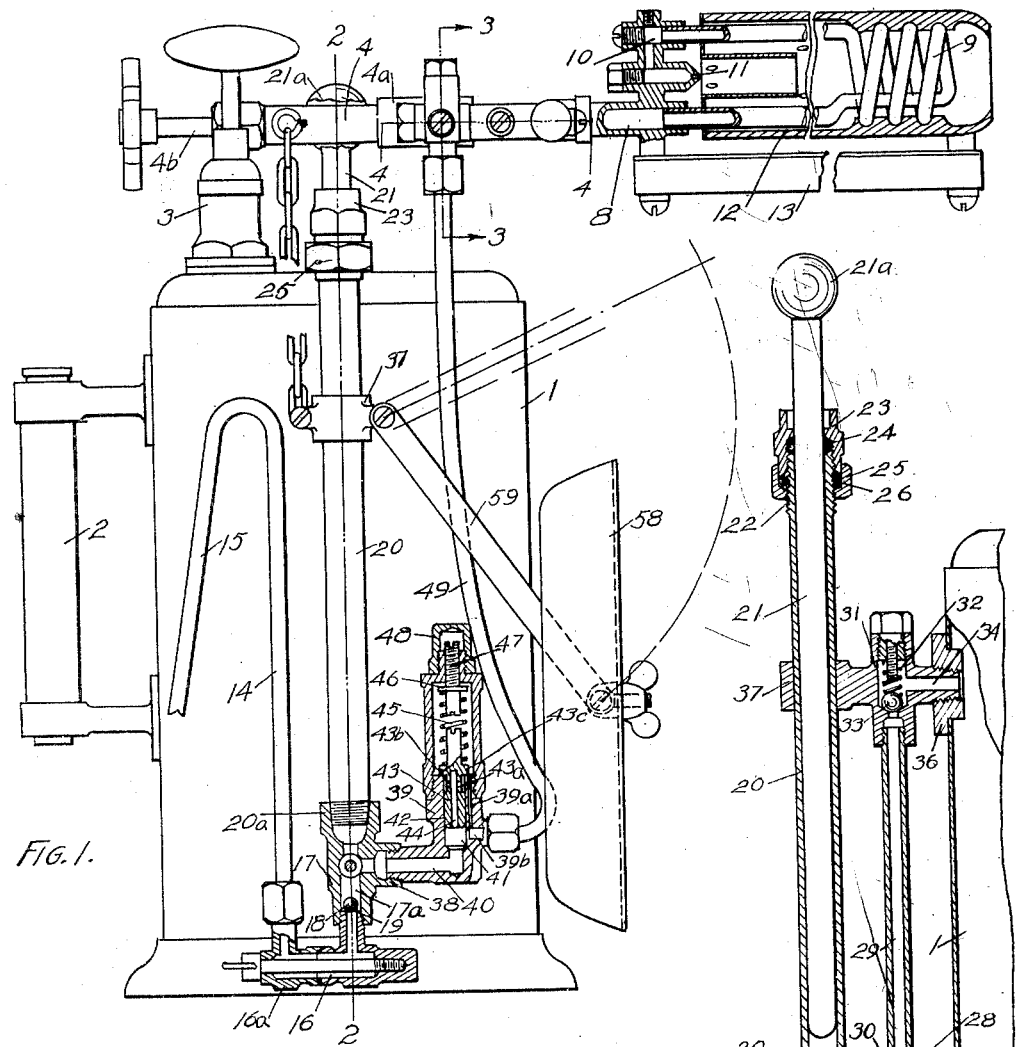
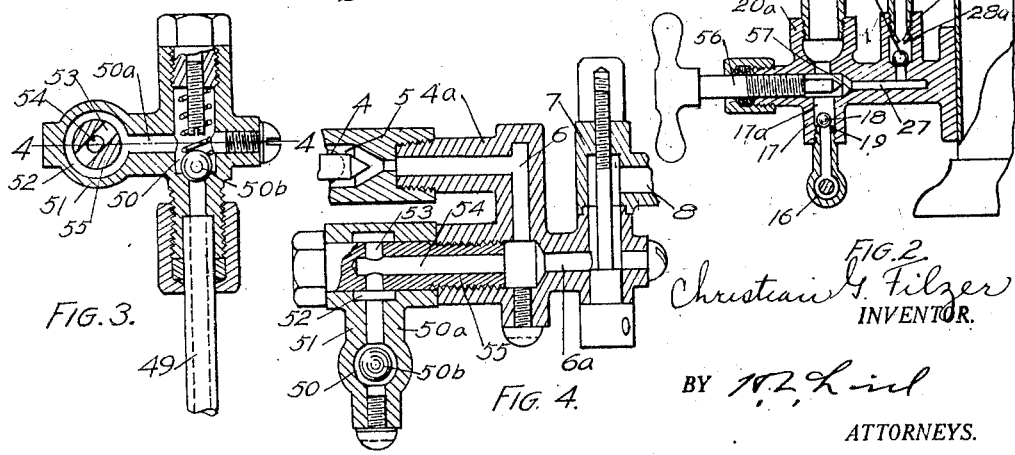
Christian G. Filzer
INVENTOR.
BY
ATTORNEYS.

Patented Feb. 23, 1932

1,846,387

UNITED STATES PATENT OFFICE

CHRISTIAN G. FILZER, OF ERIE, PENNSYLVANIA

BLOW TORCH

Application filed February 12, 1929. Serial No. 339,384.

It is often desirable to fill blow torches while the liquid in the torch is under pressure, particularly while the torch is in use in order to keep the torch in continuous operation. It is also desirable to provide some means whereby the fuel passages of the burner may be forced open by delivering liquid under pressure higher than the ordinary torch pressure to these passages. The present invention provides a means whereby the torch may be conveniently filled under pressure and a means also by which liquid under high pressure may be delivered to the fuel passages of the burner. Features and details of the invention will appear from the specification and claims.

A preferred embodiment of the invention is illustrated in the accompanying drawings as follows:—

Fig. 1 shows a side elevation of the torch, partly in section.

Fig. 2 a section on the line 2—2 in Fig. 1.

Fig. 3 a section on the line 3—3 in Fig. 1.

Fig. 4 a section on the line 4—4 in Figs. 1 and 3.

1 marks the fuel receptacle, 2 the handle for this receptacle, 3 an air pump for putting the receptacle 1 under pressure, and 4 a discharge passage from the receptacle leading to a passage 5 in a fitting 4a. A passage 5 is controlled by a closure valve 4b. The pipe 5 leads to a cross passage 6 from which a passage 6a extends. A swivel connection 7 is attached to the fitting 4a and has a passage 8 leading to the burner coil 9 at its front end. The burner coil terminates in a passage 10 and the passage 10 terminates in a nozzle 11 at the center of the burner, the burner being provided with the usual burner tube 12 and the preliminary heating cup 13. These parts are, or may be, of ordinary construction. An inlet tube 14 having a bend 15 to adapt it to be inserted in a supply receptacle leads to an inlet passage 16 in a fitting 16a. The fitting 16a is screwed into an inlet opening 17a in a fitting 17. A ball check 18 is arranged in the opening 17a and operates on a seat 19 on the end of the fitting 16a.

A pump cylinder 20 is screwed into a projection 20a on the fitting 17 and is provided with a pump plunger 21. This plunger terminates in a ball handle 21a at its upper end. The cylinder 20 is screw threaded at 22 and a flanged cap 23 is screwed on to the cylinder forming a stuffing box which is provided with a packing 24. Fuel, such as gasoline, will sometimes leak even with a fairly well designed stuffing box and follows down the threads 22. In order to avoid leakage here a flanged sleeve 25 has the flange internally screw threaded and arranged on the screw threads 22. The sleeve telescopes the end of the cap 23 and forms a stuffing box at the end of the cap in which is arranged a packing 26.

A passage 27 is arranged in the fitting and connects with the pump cylinder and with the inlet opening 17a. It discharges to a passage 28a leading to a projection 28. A tube 29 is screwed into the projection 28 and a ball check 30 is arranged in the projection preventing a return flow of liquid. The tube 29 is screwed into a fitting 31 and this fitting is provided with a valve chamber 32 connecting with the tube 29 and in which there is a spring-loaded ball check 33. The chamber 32 leads to a discharge passage 34. The fitting is screwed into a plate 36 on the side of the receptacle 1 and the passage 34 discharges to the receptacle. The fitting has a bracket 37 through which the cylinder 20 extends and thus forms a support for the upper end of the pump cylinder. The operation of the pump can be readily followed. As the plunger is operated, fuel is drawn in through the intake passage, discharged past the checks 30 and 33 to the fuel receptacle 1. With a pump as powerful as this pump preferably is, there is danger with an inexperienced operator carrying the operation to an extent to place the receptacle under a dangerous pressure. In order to avoid this I provide the following means: The pump fitting 17 has a projection 38 having a passage communicating with the opening 17a and a fitting 39 is screwed into this projection and has a passage 40 communicating with the opening 17a. This passage 40 communicates with a passage 41 extending to a cylinder 42. A plunger 43 is arranged in the cylinder and has an opening 44 through it, the opening communicating with an annular groove 43a at the upper end of the plunger through radial openings 43b. The plunger is provided with a shoulder 43c seating on the upper face of the cylinder. A spring 45 operates to seat the plunger and rests against a shoulder 46 on an adjusting screw 47. The adjusting screw is carried by a bonnet 48 which is screwed on to the cylinder 42. A passage 39a extends downwardly in the wall of the cylinder from the bonnet to a passage 39b. The passage 39b is connected with a tube 49 and this leads to a valve opening 50 in a fitting 51. A cross passage 50a leads from the opening 50 and a spring-loaded ball check 50b is arranged in the opening. The passage 50a leads to an annular groove 52 forming a connection with radial openings 53 leading to an axial opening 54 in a screw 55. The screw extends through the fitting 51 and secures it and into the fitting 4a securing the fitting 51 to the fitting 4a and the screw forming a means of communication to the passage 6 in the fitting 4a.

In the operation of this yielding safety valve when the pressure in the opening 17a and consequently the pressure being delivered to the receptacle reaches a point of danger the pressure on the lower end of the plunger 43 lifts that plunger and fuel then passes through the passage 44, radial passages 43b, annular passage 43a, bonnet 48, passage 39a and 39b to the tube 49 and thence by the passages described to the passage 6 and discharges to the burner. It will be understood that this loading apparatus is most commonly used when the fuel receptacle is being supplied with fuel while in actual use. This becomes desirable where a large heat is under way and requires more fuel than a single filling of the receptacle. By filling while in use the heat may be continued. By discharging the over-flow fuel directly to the burner any danger from the over-flow, or discharge of this fuel is obviated.

When the burner passages become obstructed this may be put under the direct action of the pump in the following manner. A closure valve 56 is arranged in the fitting 17 and is adapted to operate on a seat 57 closing off the passage 27 and thus closing the connection of the liquid pump with the fuel receptacle. The valve 4b closes the passage to the receptacle from the passage 6. The pump then is in direct communication with the burner passages through the passages just hereinbefore described with relation to the safety feature and the full pressure delivered by the pump is delivered directly to these burner passages. This makes it possible, as a rule, to force any obstructions in such passages through them so as to clear the passages.

I provide an adjustable shield 58. This shield is mounted on a swinging arm 59 pivotally connected on the bracket 37, the swinging arm being also pivotally connected to the shield. The shield may be swung up back of the burner so as to protect the operator's hand when operating the liquid pump.

What I claim is new is:—

1. In a blow torch, the combination of a fuel receptacle; a liquid pump; a filling conduit leading from the pump and delivering fuel to the receptacle; a yielding pressure controlling valve connected with the discharge of the pump; a burner; a fuel delivery conduit conveying fuel from the receptacle to the burner; and a connection from the yielding valve to the burner.

2. In a blow torch, the combination of a fuel receptacle; a liquid pump; a filling conduit leading from the pump and delivering fuel to the receptacle; a yielding pressure controlling valve connected with the discharge of the pump; a burner; a fuel delivery conduit conveying fuel from the receptacle to the burner; and a connection from the yielding valve to the burner by way of the fuel delivery conduit.

3. In a blow torch, the combination of a fuel receptacle; a liquid pump, a filling conduit leading from the pump and delivering fuel to the receptacle; a yielding pressure controlling valve connected with the discharge of the pump; a burner; a fuel delivery conduit conveying fuel from the receptacle to the burner; a connection from the yielding valve to the burner by way of the fuel delivery conduit; a valve closing the filling conduit; and a valve closing the fuel delivery conduit; whereby fuel subjected to the full force of the pump may be delivered to the connection.

4. In a blow torch, the combination of a fuel receptacle; a liquid pump; a filling conduit leading from the pump and delivering fuel to the receptacle; a burner; a fuel delivery conduit feeding fuel from the receptacle to the burner; a connection leading from the discharge of the pump to the fuel delivery conduit; and means for closing the fuel delivery conduit to the receptacle whereby the fuel subjected to the full force of the pump may be delivered to the fuel delivery conduit and thence to the burner.

5. In a blow torch, the combination of a fuel receptacle; a burner; a fuel delivery conduit leading from the receptacle to the burner; a liquid pump on the receptacle having a pump cylinder and comprising a valve fitting, said valve fitting having a check-valve controlled inlet, a valve controlled filling conduit, a yielding-valve controlled passage, and a pump cylinder projection to which the pump cylinder is attached; a connection between the filling conduit and the receptacle; and a connection between the passage and the burner.

6. In a blow torch, the combination of a fuel receptacle; a burner; a fuel delivery conduit leading from the receptacle to the burner; a liquid pump on the receptacle having a pump cylinder and comprising a valve fitting, said valve fitting having a check-valve controlled inlet, a valve controlled filling conduit; a yielding-valve controlled passage, a pump cylinder projection to which the pump cylinder is attached, and a closure valve in the filling conduit; a connection between the filling conduit and the receptacle; and a connection between the passage and the burner.

In testimony whereof, I have hereunto set my hand.

CHRISTIAN G. FILZER.